Dec. 19, 1939.  J. W. SKROBACK  2,184,061
AUTOMOBILE JACK
Filed Sept. 13, 1939   3 Sheets-Sheet 1
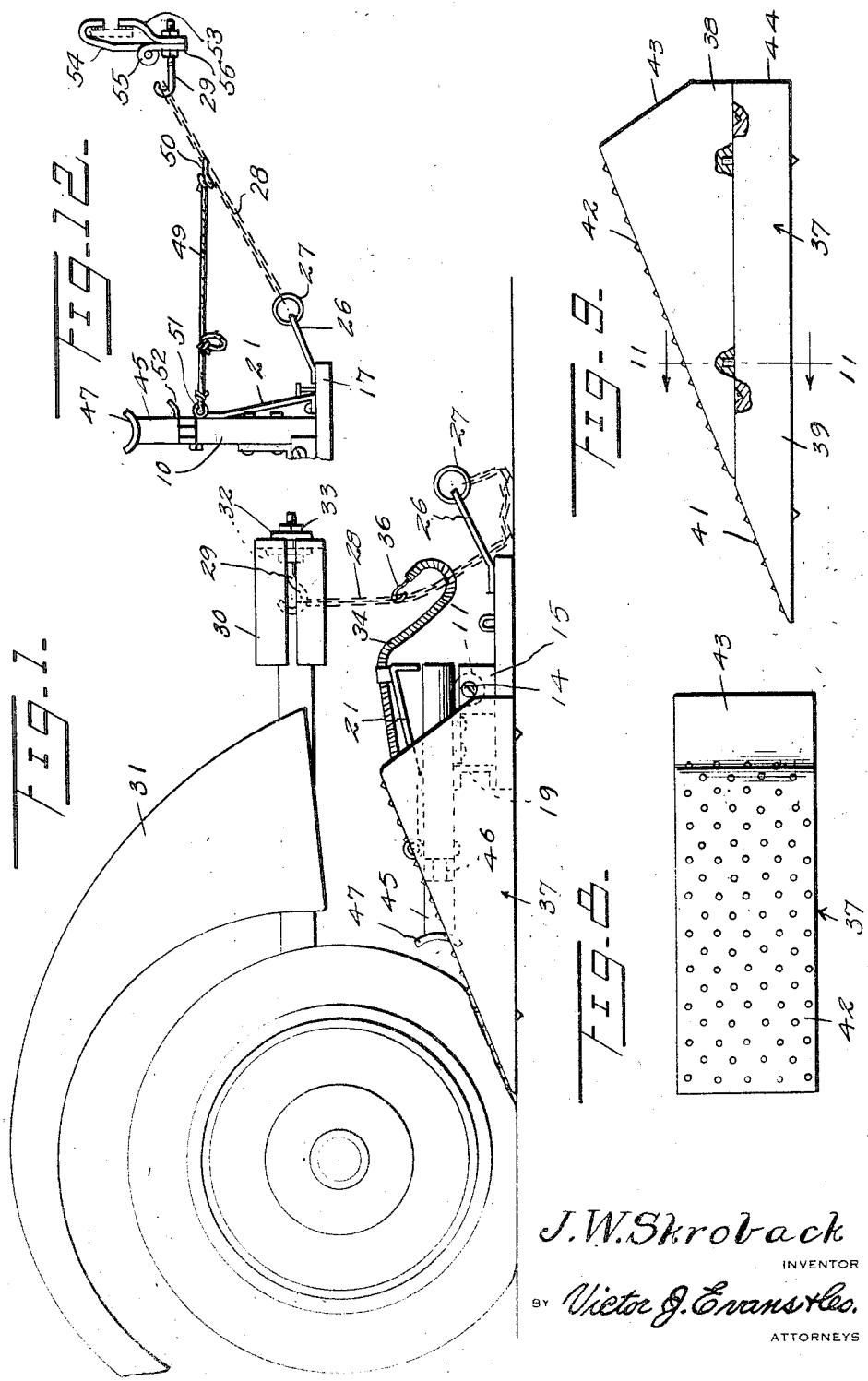
J. W. Skroback
INVENTOR
BY Victor J. Evans & Co.
ATTORNEYS

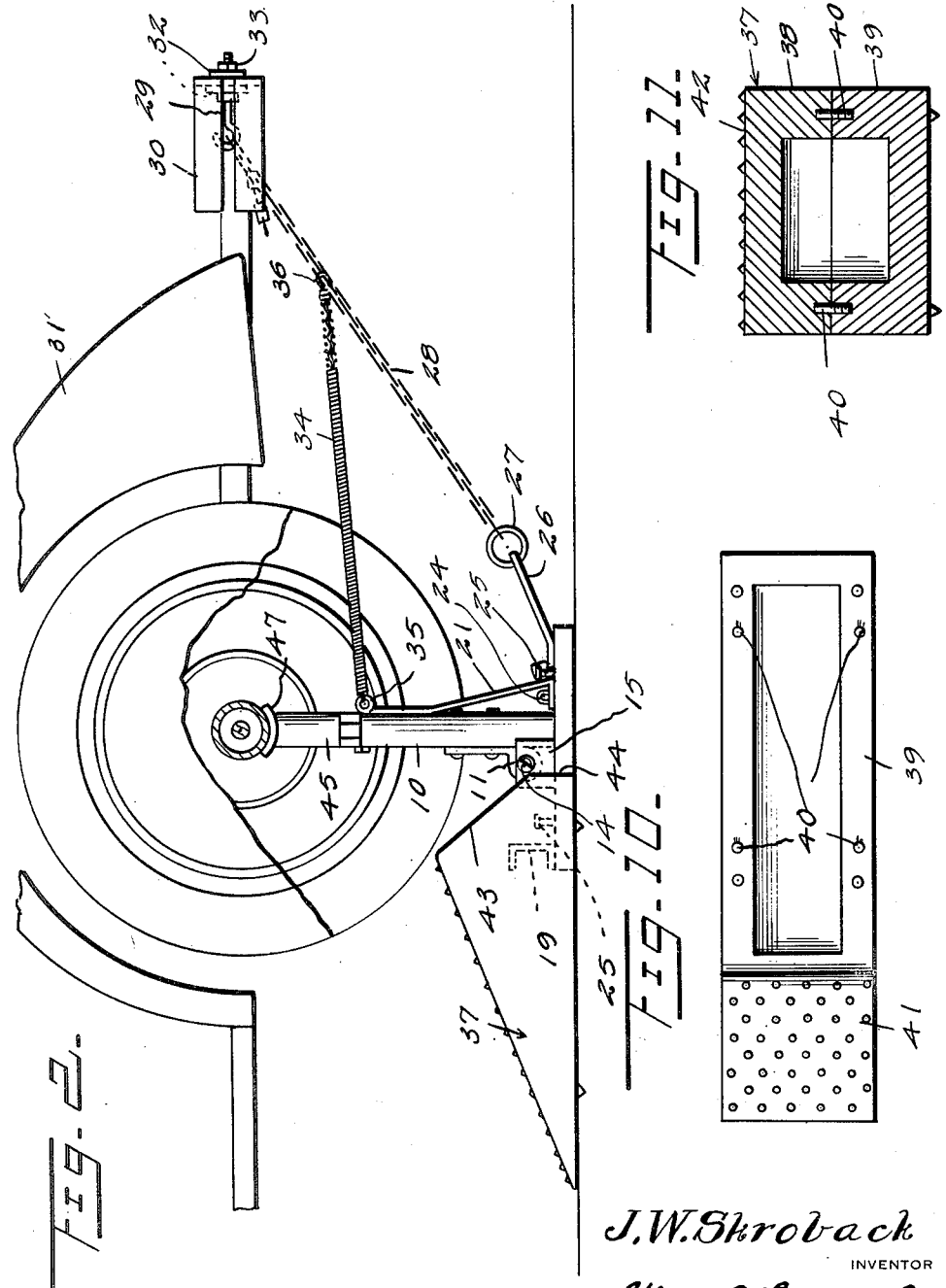

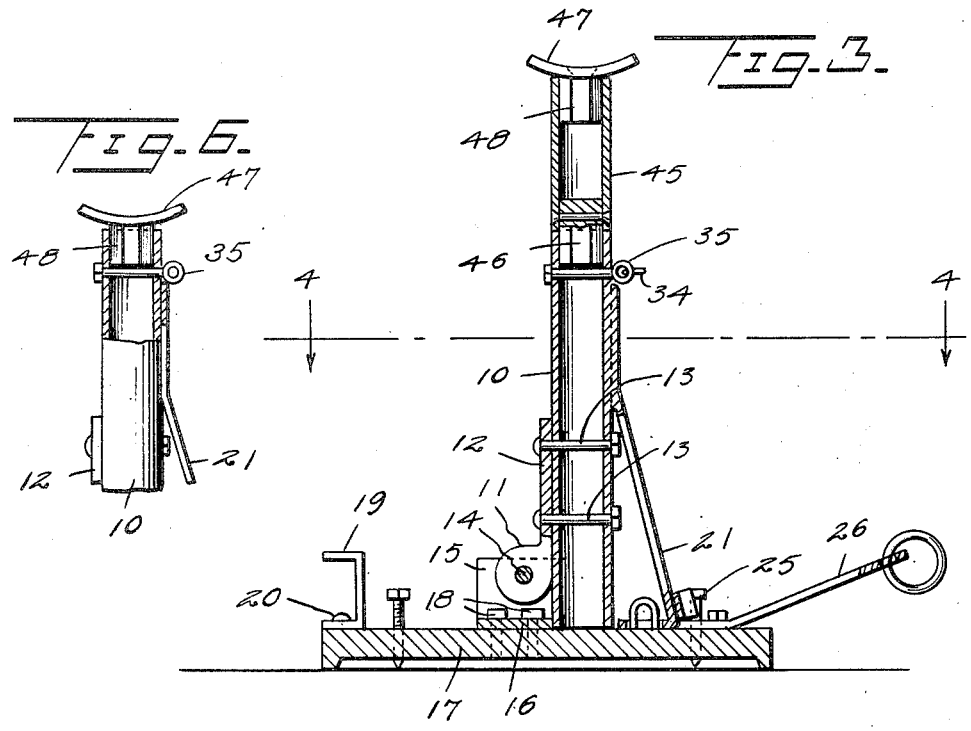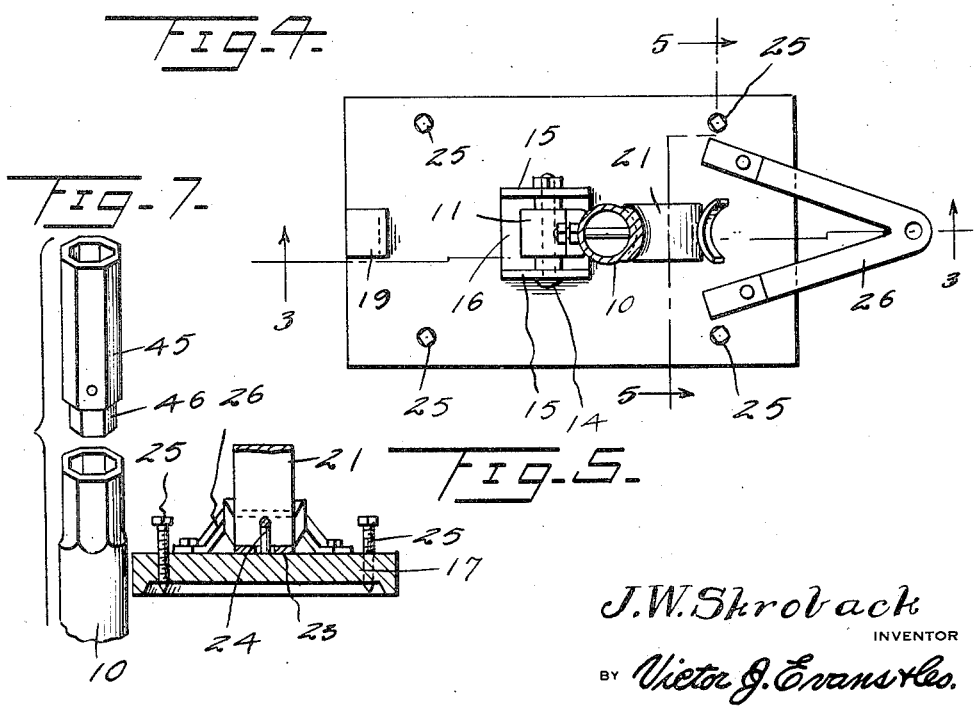

Patented Dec. 19, 1939

2,184,061

UNITED STATES PATENT OFFICE 2,184,061

AUTOMOBILE JACK

John W. Skroback, Olean, N. Y.

Application September 13, 1939, Serial No. 294,730

5 Claims. (Cl. 254—88)

This invention relates to automobile jacks and has for an object to provide a jack having a chain adapted to be attached to the bumper for properly positioning the jack to raise an axle when the car is moved under its own power up an inclined runway block, thus eliminating the necessity of a driver stooping down to place the jack in position which usually results in soiling the clothing.

A further object of the invention is to provide a jack of this type which may be adjusted to fit any type of automobile by simply hooking a different link of the chain into a hook attached to the bumper.

A further object is to provide a device of this character in which the jack is provided with a removable extension to vary the height of the jack to suit the height of the front or rear axle of the automobile.

A further object is to provide a device of this character which will be formed of a few strong simple and durable parts, which will be inexpensive to manufacture and which will not easily get out of order.

With the above and other objects in view the invention consists of certain novel details of construction and combinations of parts hereinafter fully described and claimed, it being understood that various modifications may be resorted to within the scope of the appended claims without departing from the spirit or sacrificing any of the advantages of the invention.

In the accompany drawings forming a part of this specification:

Figure 1 is a side elevation of the jack and runway block in initial position underneath an automobile rear bumper.

Figure 2 is a side elevation of the jack, similar to Figure 1, but showing the jack pulled to raised position by the chain and pull cord as the vehicle is backed up the runway.

Figure 3 is a longitudinal sectional view of the jack with the extension applied thereto to increase the height of the jack.

Figure 4 is a cross sectional view of the jack taken on the line 4—4 of Figure 3.

Figure 5 is a cross sectional view of the jack taken on the line 5—5 of Figure 4.

Figure 6 is a fragmentary side elevation of the jack, partly in section, with the extension removed to decrease the height of the jack.

Figure 7 is a perspective view of the extension.

Figure 8 is a plan view of the runway block.

Figure 9 is a side elevation of the runway block showing the two sections thereof connected by dowel pins.

Figure 10 is a plan view of the lower section of the runway block.

Figure 11 is a cross sectional view taken on the line 11—11 of Figure 9.

Figure 12 is a side elevation of a modified form of the invention.

Referring now to the drawings in which like characters of reference designate similar parts in the various views, 10 designates a jack, shown in detail in Figure 3, the same preferably being formed of a metal tube. A hinge barrel 11 is provided with a leaf 12 which is bolted to the side of the jack as shown at 13 near the bottom thereof. A hinge pin 14 is passed through the barrel and through the legs of a U-bracket 15. The barrel is received between the legs of the bracket, and the web 16 of the bracket is bolted to a base plate 17 by bolts 18. The jack may be rocked forwardly to the horizontal on the pivot pin 14 and when in this position is supported upon a chanel iron stop 19 which is bolted to one end of the base plate as shown at 20. The jack may be rocked to the vertical and when in this position the lower end thereof is supported upon the top face of the base plate. An inclined brace 21 is secured to the jack and the lower end of the brace is provided on one side with a foot 22 which rests upon the top face of the base plate when the jack is in vertical position. The foot is slotted as shown at 23 in Figure 5 to receive a guide in the form of a staple 24 which is fixed to the base plate.

The base plate is provided with anchoring screws 25 arranged preferably at the corners of the plate as shown in Figure 4 to prevent the plate from slipping on icy surfaces. The plate rests flat upon the ground when in use.

The base plate is provided with a substantially V-shaped bracket 26 which carries a ring 27 to which one end of a chain 28 is attached. The terminal link at the free end of the chain is adapted to be hooked over a hook 29, shown in Figures 1 and 2, which is secured to a respective bumper 30 of an automobile 31 through the medium of stop washers 32 and a nut 33. The chain is of such length as to drag the jack to operative position directly under the axle, whether front or rear, when the automobile is moved under its own power to raise the jack as will now be described.

A stout helical spring 34 is hooked at one end to an eye bolt 35 carried by the jack 10 and is reinforced against too free expansion through the medium of the cable which is confined within the free end of the spring. The free end of the spring terminates in hook 36 which may be hooked into a pre-determined link of the chain so that when the cable is drawn taut by motion of the vehicle the spring and cable will meantime have raised the jack from the horizontal position to the vertical position directly under the axle to be supported.

In further carrying out the invention, a runway block 37 is provided. Preferably the block is formed of two hollow sections 38 and 39 detachably connected together by dowel pins 40 so that the runway block may be disassembled for storing in a small space. The sections are provided with roughened top bases 41 and 42 which form a continuous free inclined runway when the sections of the block are assembled and afford good traction for the wheel of the vehicle. The rear end wall 43 of the runway block slopes abruptly downward and emerges into a vertically disposed short rear wall 44 as best shown in Figures 1 and 2.

An extension 45, best shown in Figure 7, is provided at the bottom with a lug 46 adapted to enter the top of the jack 10 to increase the height of the jack to compensate for the difference in height between the rear axle and front axle of an automobile. The extension, lug, and upper end of the jack are octagon in cross section to prevent relative rotation of the parts.

A curved cap plate 47, adapted to receive the axle, is provided with a lug 48 also of octagon cross section adapted to be interchangeably received in either the top of the extension 45 or the top of the jack 10.

In operation, assuming the flat tire is on a rear wheel, the runway block 37 is placed in rear of the tire as shown in Figure 1, then the driver grasps the chain 28 and drags the jack to a position directly underneath the bumper 30 and hooks the free end of the chain on the hook 29. The parts are then in a position shown in Figure 1 with the jack disposed horizontally.

The driver then backs the automobile up the runway block to the position shown in Figure 2 and while this is being done the rear bumper 39 straightens out the chain which in turn pulls on the cable 35 and spring 34 to elevate the jack to the vertical directly underneath the axle.

As the wheel rides off of the runway block the axle drops on to the cap plate 47. When the tire has been repaired the runway block 37 is then removed from in front of the rear wheel and placed in rear of the rear wheel in position to furnish traction for the rear wheel. The vehicle under its own power is then moved forward up the runway block to lift the axle from the jack. The forward movement of the vehicle on the runway block slackens the chain 27 so that when the axle clears the jack the wheel may ride off of the runway block onto the ground. Then the chain 27 may be unhooked and the jack collapsed to horizontal for storage.

In Figure 12 is shown a modified form of the invention in which a cable 49 is substituted for the helical spring 34. The cable is provided with a hook 50 at one end to be hooked to the chain 23 and at the opposite end is provided with a ring 51 which is engaged on a gently curved hook 52 carried by the standard 10 when the standard is in horizontal position. When the standard is raised by the cable to the vertical position the ring slips off the hook.

As also shown in Figure 12 the hook 29 may be removably secured to the bumper through the medium of a clamp comprising a jaw 53 adapted to project up over the bottom of the bumper and a jaw 54 hinged as shown at 55 to a plate 56 and adapted to hook over the top of the bumper. The hook 29 is engaged through the plate 56 and jaw 53 as shown.

From the above description it is thought that the construction and operation of the invention will be fully understood without further explanation.

What is claimed is:

1. The combination of a base plate, a jack hinged to the base plate to swing from a horizontal to a vertical position, a runway block, and means connected to the jack and to the base plate and adapted to be connected to the bumper of a motor vehicle for moving the jack to operative position under the vehicle axle when the vehicle is driven up the run way.

2. The combination of a base plate, a jack hinged to the base plate, a stop for normally supporting the jack in horizontal position, an inclined brace secured to the jack and adapted to engage the base plate to support the jack in vertical position, a runway block, a flexible connector connected to the base plate and adapted to be secured at the free end to the bumper of a motor vehicle, and a flexible connector secured to the jack and to the first named flexible connector adapted to raise the jack to operative position under the vehicle's axle when the first named flexible connector is drawn taut as the vehicle is driven up the runway.

3. The combination of a base plate, a jack hinged to the base plate to swing from a horizontal to a vertical position, a runway block having a roughened inclined top face upon which the wheel of a motor vehicle may have traction when the vehicle is moved under its own power up the runway block, a chain connected to the base plate and adapted to be secured at the free end to the bumper of the vehicle for dragging the jack, and a flexible connector connected to the jack and adjustably connected at the free end of the chain for raising the jack to vertical position as the chain is drawn taut as the vehicle is moved under its own power up the runway to raise the jack to operative position underneath the vehicle's axle.

4. The combination of a base plate, a jack hinged to the base plate to swing from a horizontal position to a vertical position, an extension removably secured to the jack for accommodating the jack to the front or rear axle of a motor vehicle, a cap member interchangeably received with the extension and with the jack to form a cradle for the axle of the vehicle when the jack is in vertical operative position, a runway block, a means connected to the jack and to the base plate and adapted to be connected to the bumper of the motor vehicle for moving the jack to operative position under the vehicle axle when the vehicle is driven up the runway block.

5. The combination of a base plate, a jack hinged to the base plate to swing from a horizontal to a vertical position, a chain connected to the base plate, a cable connected to the chain, a hook on the jack adapted to receive the cable to permit the cable to pull the jack to upright position when the chain is pulled outwardly and then slip off the hook, a clamp comprising a fixed jaw and a hinged jaw adapted to engage over a vehicle bumper, and a hook carried by the jaws and secured to said chain.

JOHN W. SKROBACK.